United States Patent [19]

Steigerwald et al.

[11] 4,223,199
[45] Sep. 16, 1980

[54] CHARGED PARTICLE BEAM WELDING WITH BEAM DEFLECTION AROUND WELD POOL RETAINERS

[75] Inventors: Karl-Heinz Steigerwald, Starnberg; Wilhelm Scheffels, Puchheim, both of Fed. Rep. of Germany

[73] Assignee: Steigerwald Strahitechnik G.m.b.H., Munich, Fed. Rep. of Germany

[21] Appl. No.: 909,526

[22] Filed: May 25, 1978

[30] Foreign Application Priority Data

May 30, 1977 [GB] United Kingdom ............... 22788/77

[51] Int. Cl.² ...................... B23K 15/00; B23K 9/08; B23K 37/06; B22D 27/02
[52] U.S. Cl. ...................... 219/121 EM; 219/121 EB; 219/160; 219/123; 164/49
[58] Field of Search ................ 219/121 EB, 121 EM, 219/160, 123, 126; 164/49, 250

[56] References Cited

U.S. PATENT DOCUMENTS

| | | |
|---|---|---|
| 3,197,604 | 7/1965 | Turbyville, Jr. et al. ........ 219/160 X |
| 3,829,651 | 8/1974 | Olshansky et al. ............ 219/121 EM |
| 3,839,619 | 10/1974 | Normando et al. ............... 219/73 X |
| 4,038,484 | 7/1977 | Shrader ..................... 219/121 EB X |

FOREIGN PATENT DOCUMENTS 2204187 8/1973 Fed. Rep. of Germany .
2818893 11/1978 Fed. Rep. of Germany ........... 219/160

*Primary Examiner*—B. A. Reynolds
*Assistant Examiner*—Keith E. George
*Attorney, Agent, or Firm*—Brumbaugh, Graves, Donohue & Raymond

[57] ABSTRACT

A method and apparatus for charged particle beam welding is provided with a beam deflection mechanism adjacent the surface of the workpiece. The beam deflection mechanism permits the use of a welding shoe for retaining a pool of molten material adjacent the point of welding.

17 Claims, 30 Drawing Figures

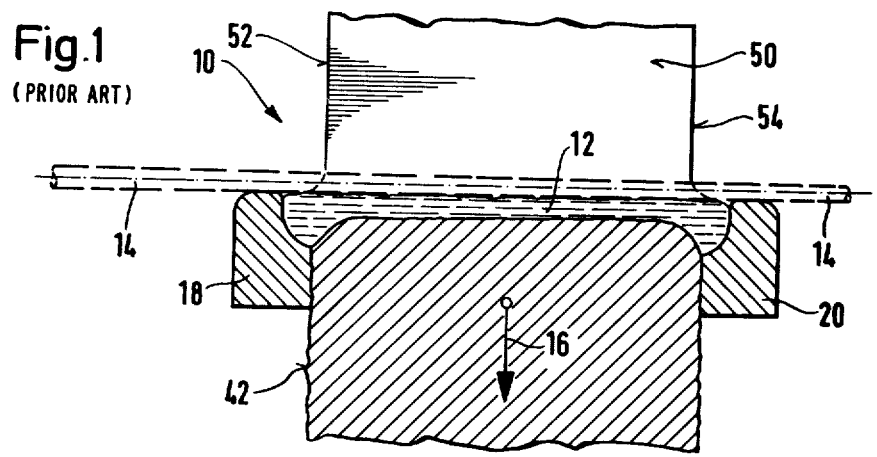
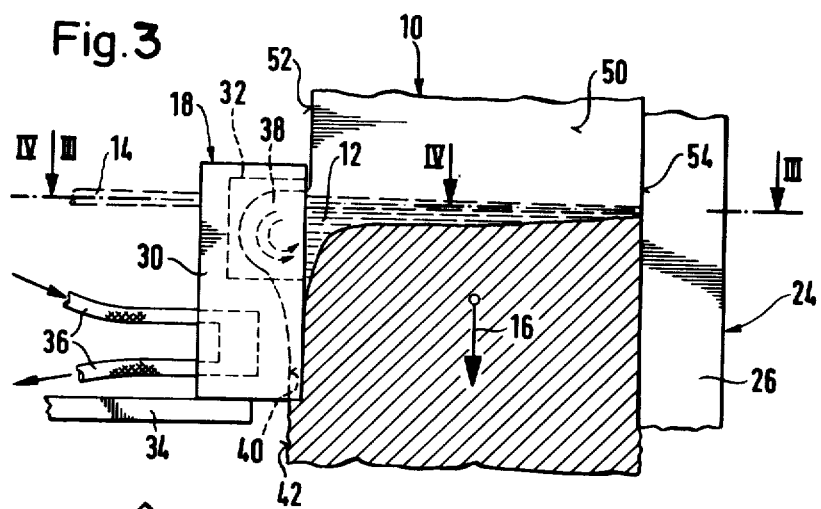
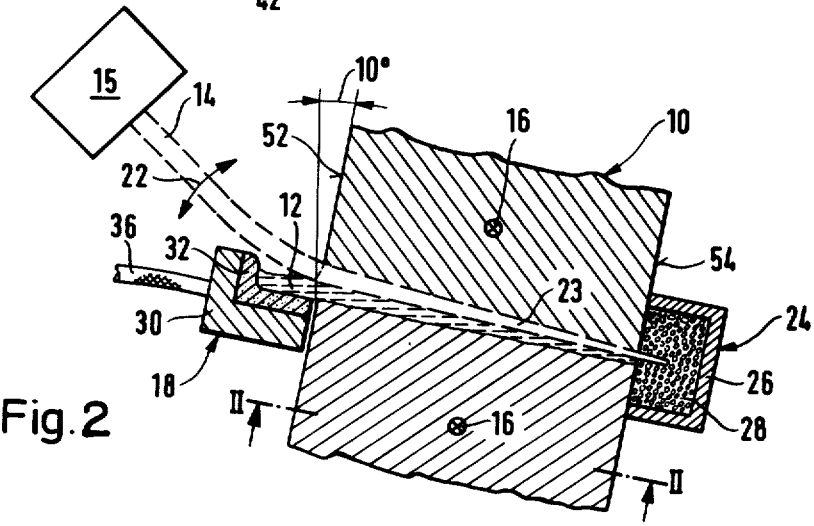

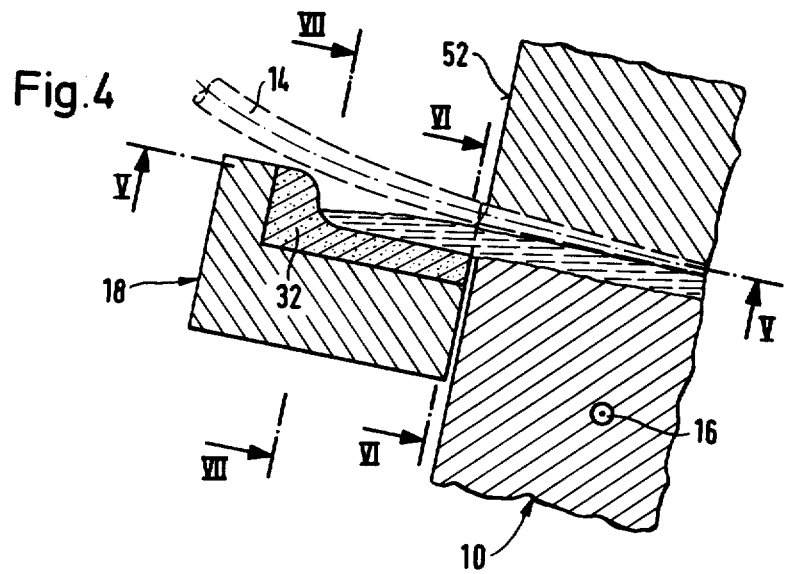
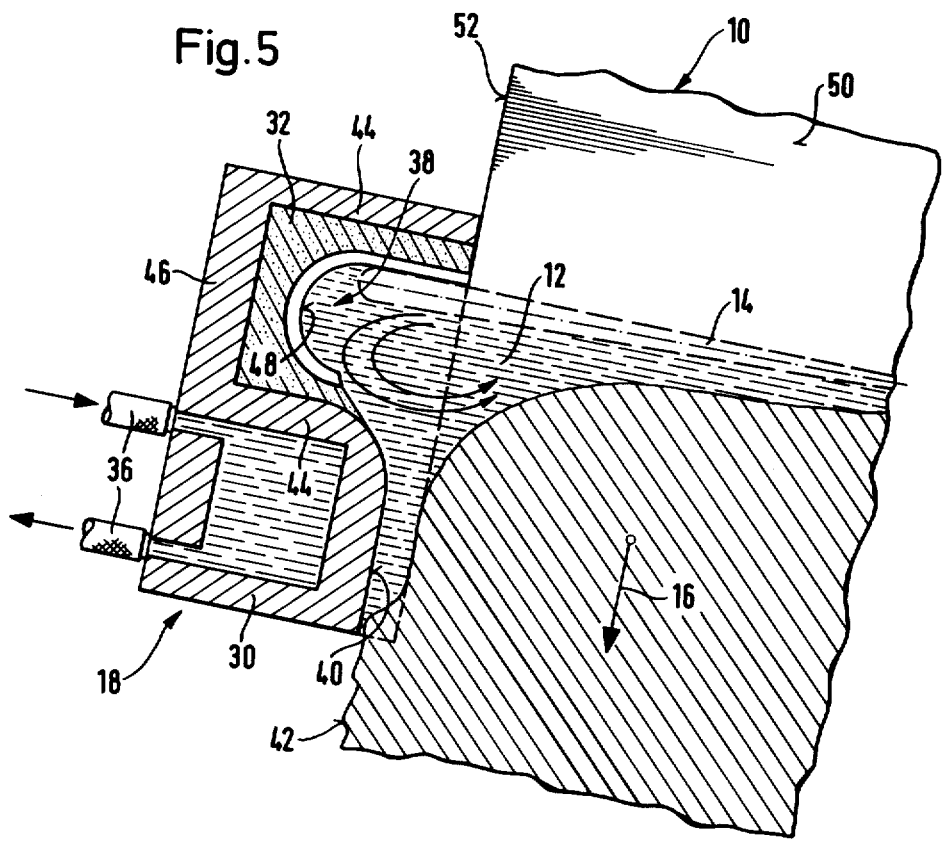

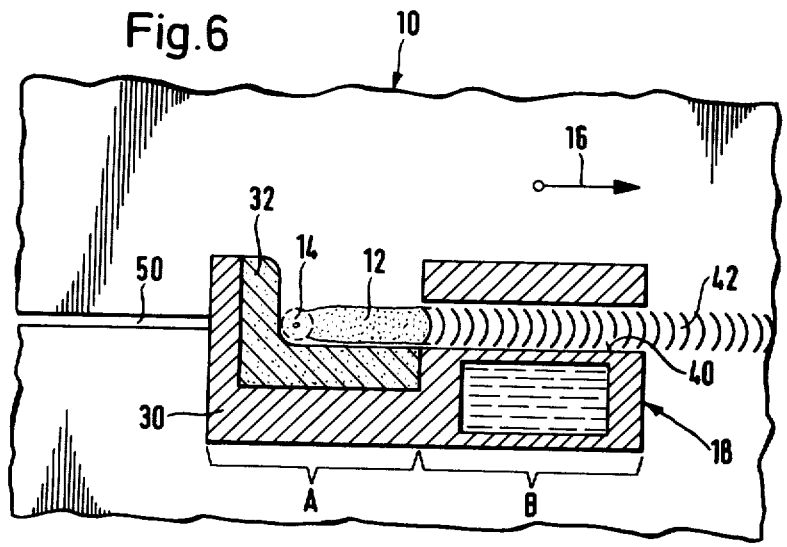
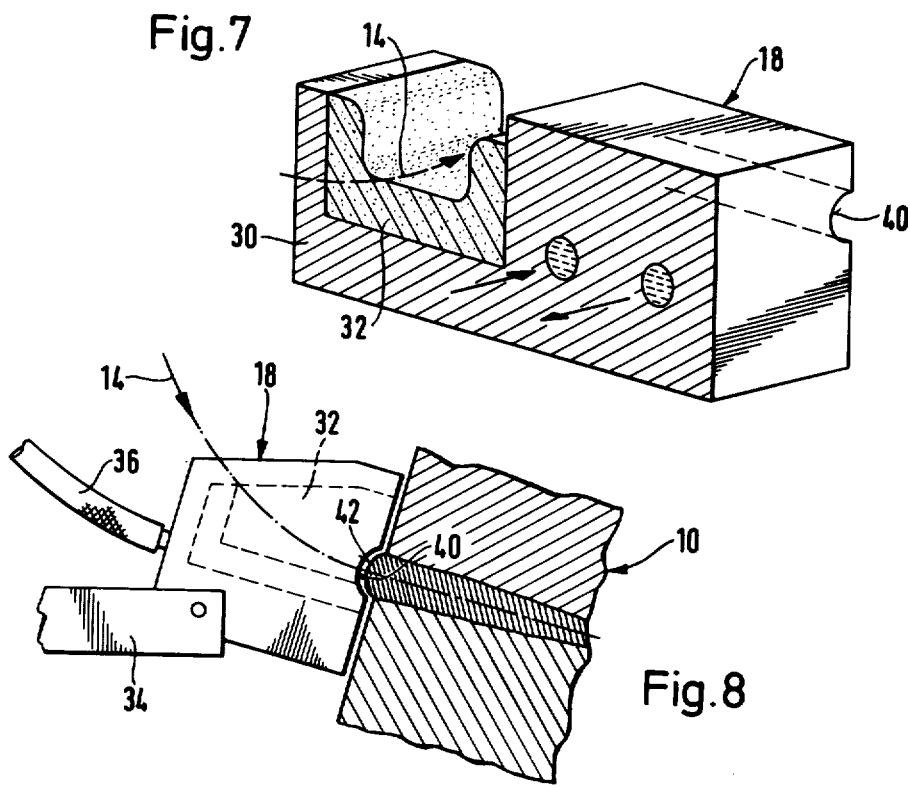

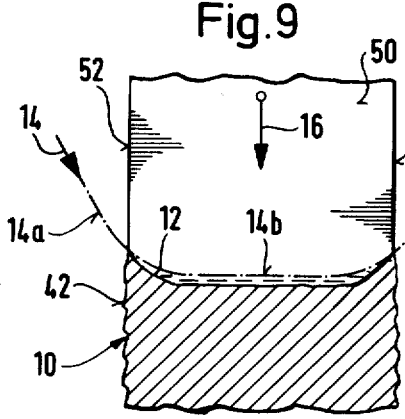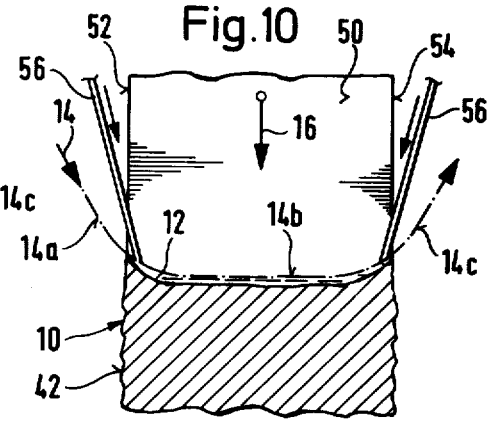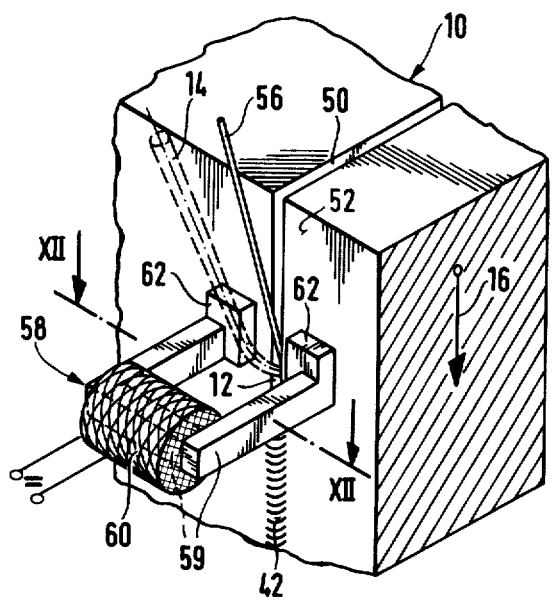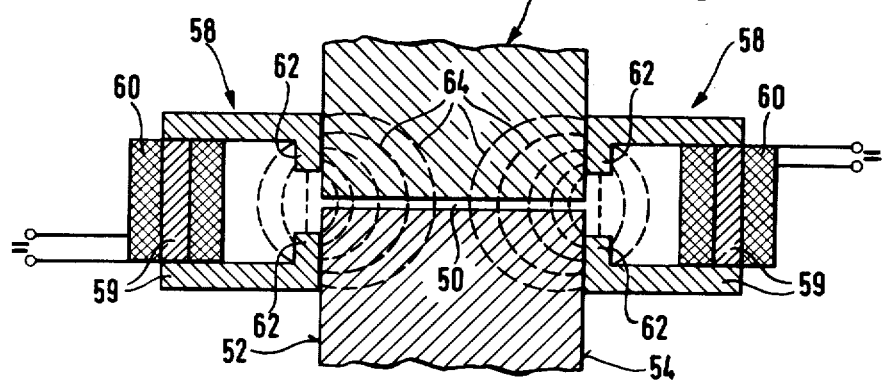

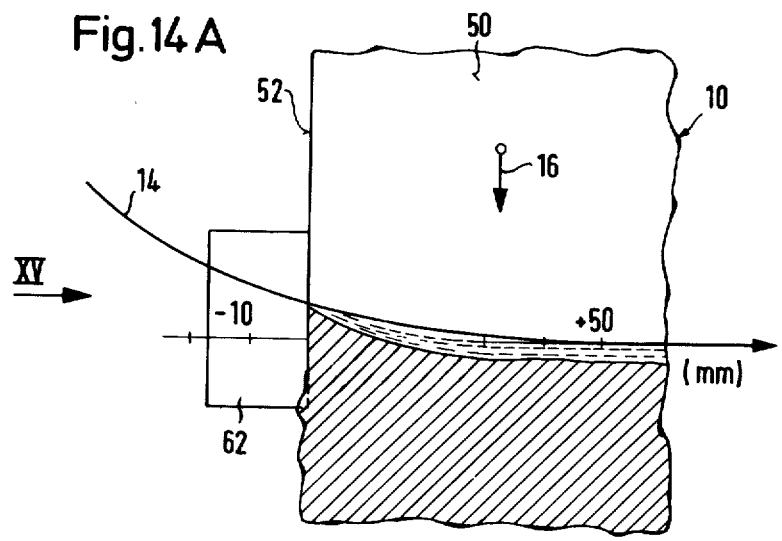
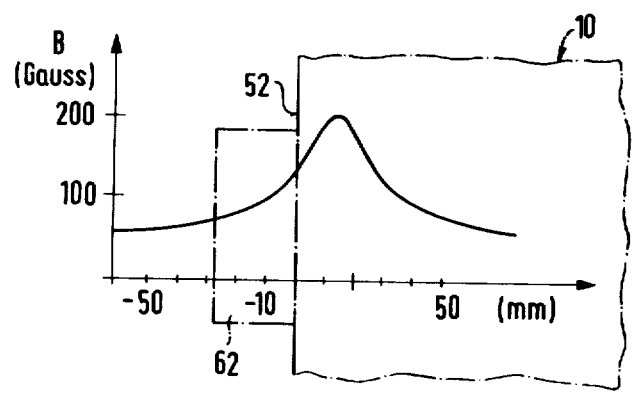
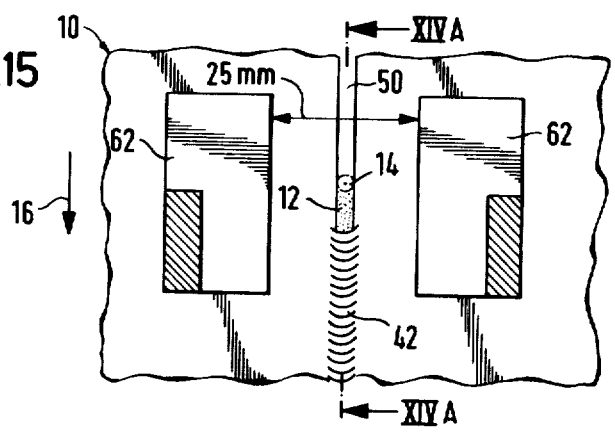

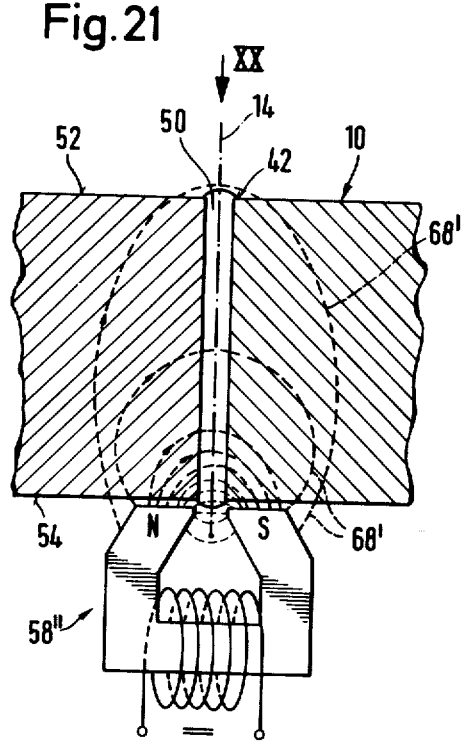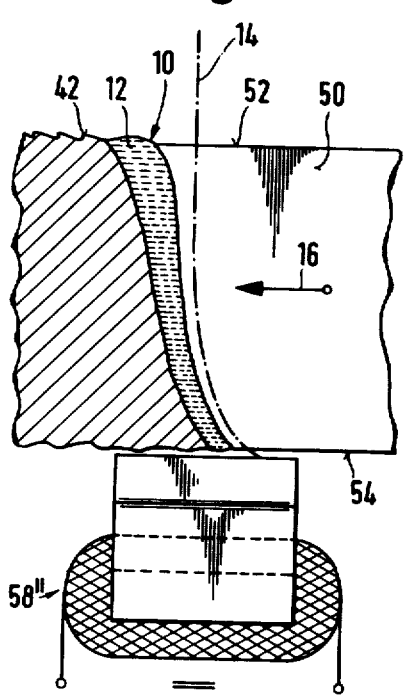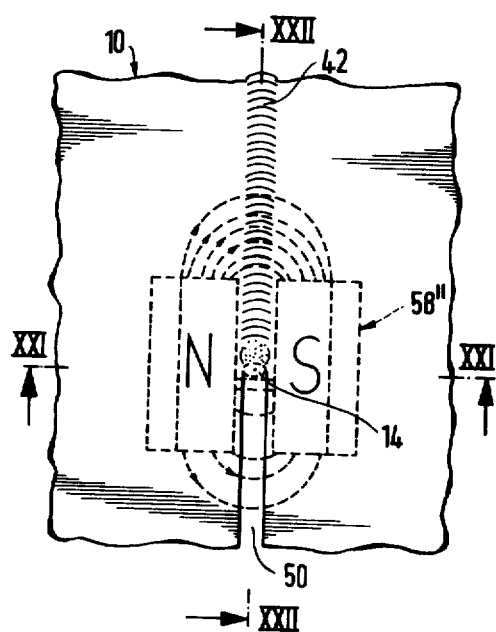

CHARGED PARTICLE BEAM WELDING WITH BEAM DEFLECTION AROUND WELD POOL RETAINERS

The present invention relates to welding a workpiece with a beam of charged particles, as an electron beam.

When a workpiece of considerable thickness, say 50 mm and above, is welded with a beam of charged particles, as an electron beam, one major problem is to prevent the material melted by the beam from flowing out of the welding zone. The use of a retaining shoe for the molten pool of metal is known in vertical welding with a horizontal electron beam from German Offenlegungsschrift No. 22 04 187. This is based on the assumption, that the liquid level of the molten pool is a few millimeters below the cross-section of the beam. Therefore, the pool retaining shoe can be situated so far below the beam that it is not hit and damaged by the beam. One shoe can be used at the beam entrance side, and another shoe at the beam exit side, the shoes being moved synchronously in vertical direction with the beam during the welding of a vertically extending joint with a horizontally directed beam.

This principle cannot be used for horizontal welding, i.e. a generally horizontal joint, because the molten material will flow over the shoes which must be positioned below the beam to avoid obstruction of the beam and damaging of the shoes.

It is an object of the invention to provide method and apparatus for welding a workpiece with a beam of charged particles such that the melt is prevented from flowing out of the welding zone and cavities in the welding seam as a result of the melt which has run out are avoided.

An important feature of the invention is that the beam of charged particles which propagates along a beam path, which extends into a workpiece, is deflected at or near a surface of the workpiece (say, within 15 mm or 30 mm from said surface) in such a sense, that the direction of the deflected beam is nearer to the vertical upward direction than the direction of the beam before deflection. In other words, the angle, which is needed, to turn an arrow pointing in the direction of the deflected beam into the vertical upward direction is smaller than the angle needed to turn an arrow, which points in the direction of the beam before deflection, into the vertical upward direction.

Generally, the beam may approach a beam entrance surface of the workpiece in a direction inclined downwards with respect to the horizontal, say with an angle between 10 and 85 degrees, as between 25 and 60 degrees, and the beam is deflected near the beam entrance side of the workpiece into a generally horizontal direction. Thus the beam follows a horizontal path within the workpiece. Alternately, the beam deflection may cause the beam path within the workpiece to have a downwardly sloping portion, an upwardly sloping portion, or both downwardly and upwardly sloping portions. If the beam penetrates the workpiece and emerges from a beam exit surface thereof, the beam is preferably deflected up near this surface. In this case, a backing material, which is preferably particulate, may be applied to the beam extit side where the beam emerges, and a retaining shoe may be applied to the beam entrance side, both for retaining the molten material within the workpiece. Due to the deflection of the beam, the shoe at the entrance side can be positioned such that it effectively retains the melt without being damaged by the beam. Preferably, the shoe moves with the beam along the joint during welding the seam by a horizontal movement of the beam with respect to the workpiece. According to another embodiment of the invention, the beam is magnetically deflected at the beam entrance side of the workpiece and/or within the workpiece and/or at the beam exit side of the workpiece. These measures can be used single, in any combination and in combination with a beam which approaches the workpiece sloping down at an angle of preferably at least 5 degrees with the horizontal direction, or in case of the deflection of the beam at the exit side, with a generally vertical beam.

The invention will be described by the way of examples with reference to the accompanying drawings in which:

FIG. 1 is a vertical sectional view of melt or pool retention according to the prior art, the direction of welding being vertical, FIG. 2 is vertical sectional view through a workpiece while being welded with a method and apparatus according to a first embodiment of the invention; the direction of welding being horizontal;

FIG. 3 is a plan view of the workpiece and pool retaining shoe shown in FIG. 2;

FIG. 4 is a vertical section in a plane IV—IV of FIG. 2 with the sectional planes V—V for FIG. 5, VI—VI for FIG. 6 and VII—VII for FIG. 7, FIG. 5 is a sectional view at section line V—V of FIG. 4 in the beam planes through the melt pool, FIG. 6 is a sectional view at section line VI—VI of FIG. 4, and shows the beam, melt pool, the welding gap, and an upper bead, FIG. 7 is a partly perspective, partly sectional view at section line VII—VII of FIG. 4 through the retaining shoe without the melt pool to illustrate a "trough" in a ceramic insert member and the incidence of the beam FIG. 8 is an end view of the retaining shoe, FIG. 9 is a schematic vertical section through a joint of a workpiece welded by an electron beam deflected according to another aspect of the invention;

FIG. 10 is a view similar to FIG. 9 and shows, how an additional material can be supplied to the beam entrance and/or beam exit zone of the workpiece;

FIG. 11 is a perspectivic view of a magnetic deflection device which can be used for deflecting the beam as shown in FIGS. 9 and 10;

FIG. 12 is a schematic horizontal cross section in a plan XII—XII of FIG. 11.

Figure 13:
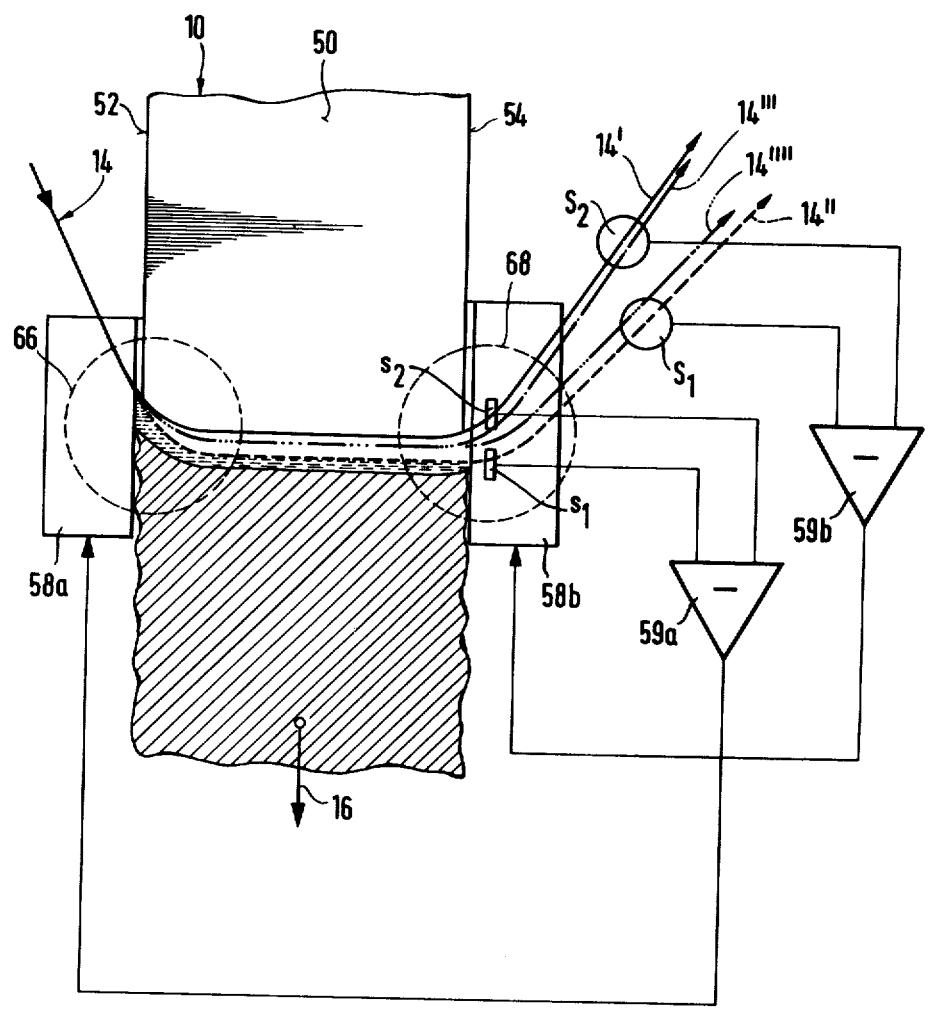
Figure 16:
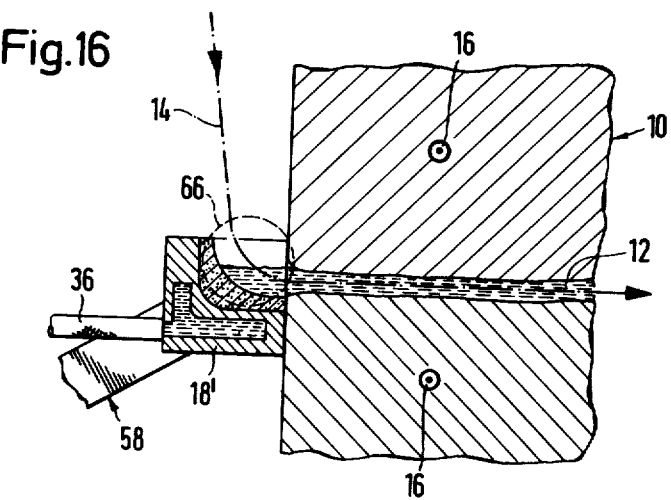
Figure 17:
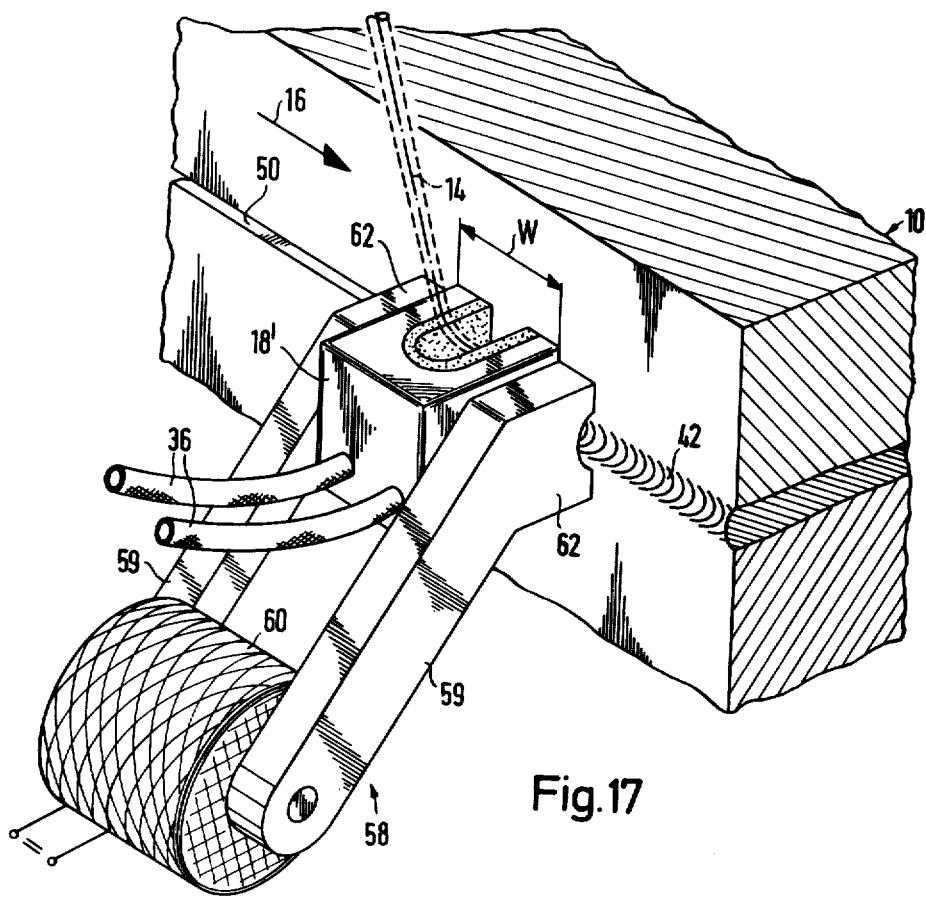
Figure 18:
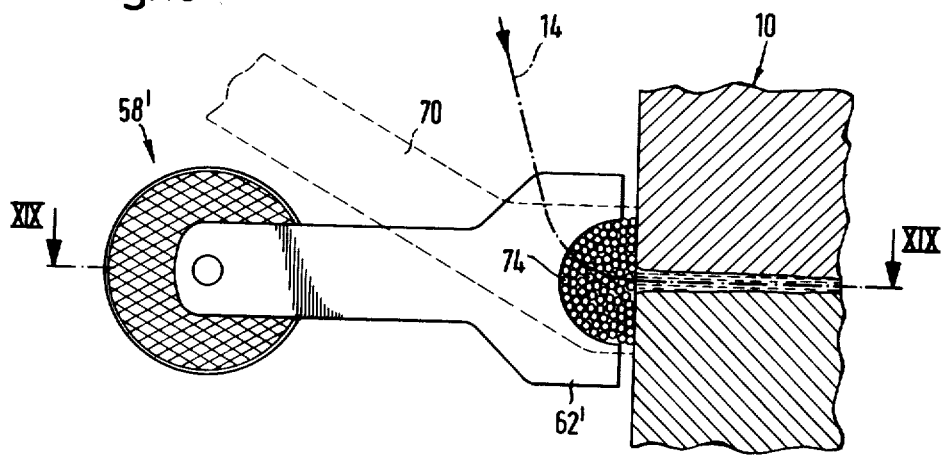
Figure 19:
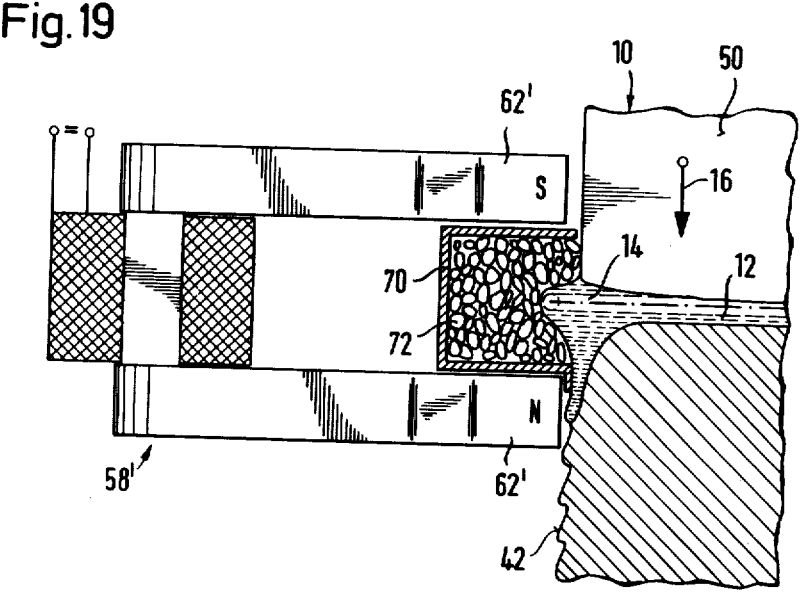
Figure 23:
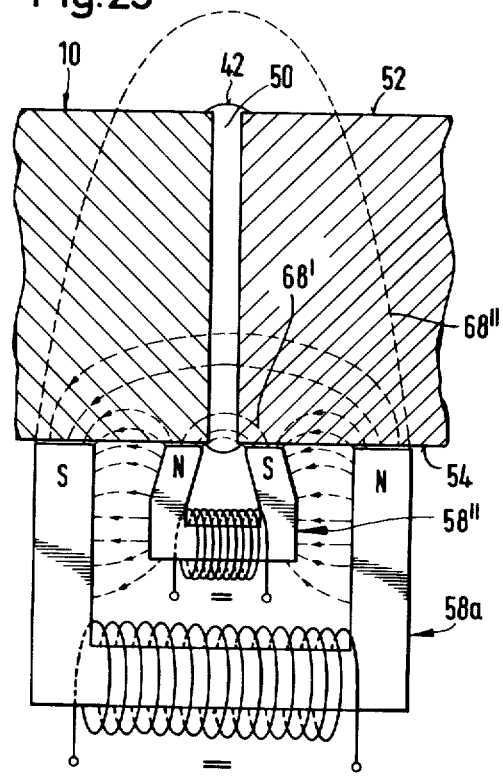
Figure 24:
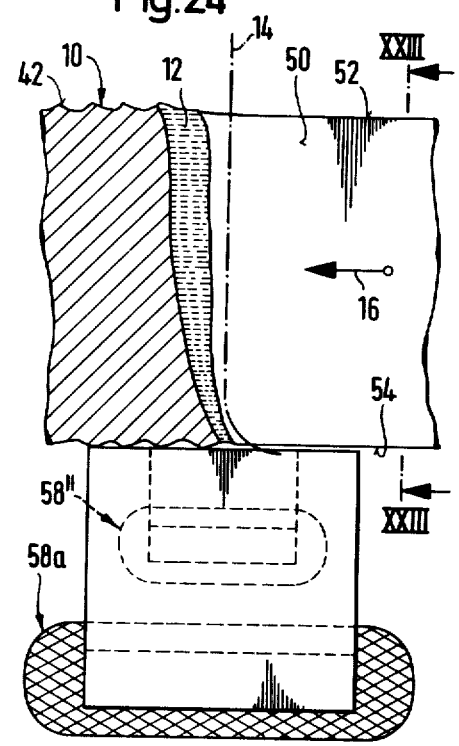
Figure 25:
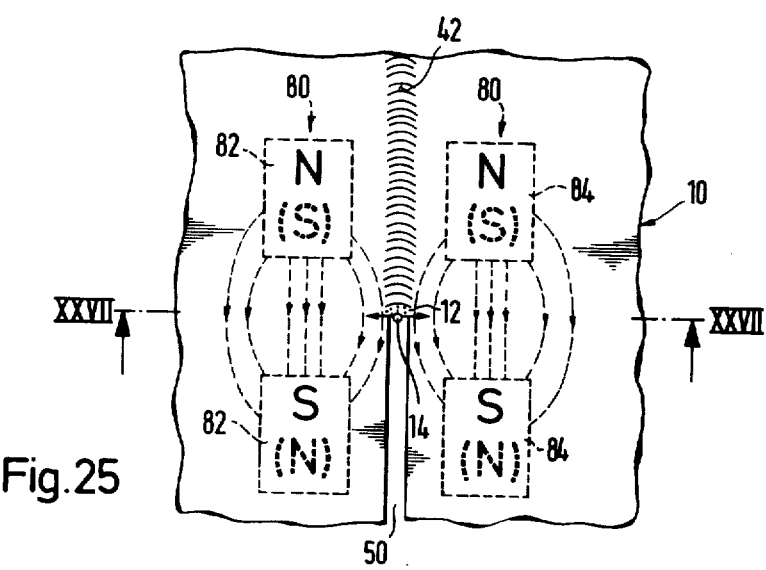
Figure 27:
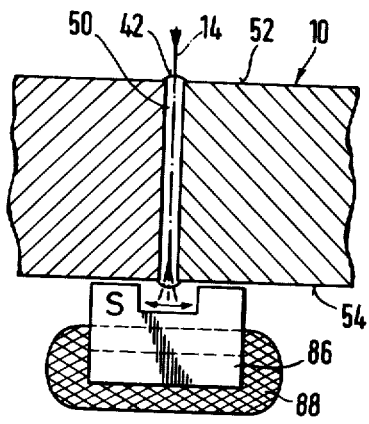
Figure 26:
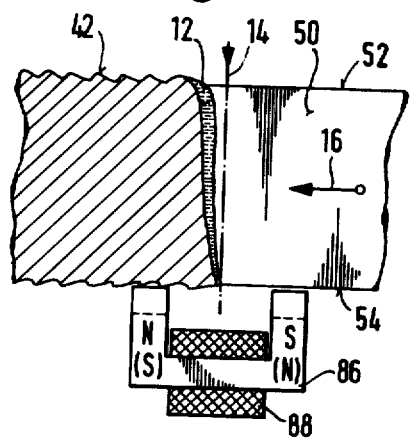
Figure 28:
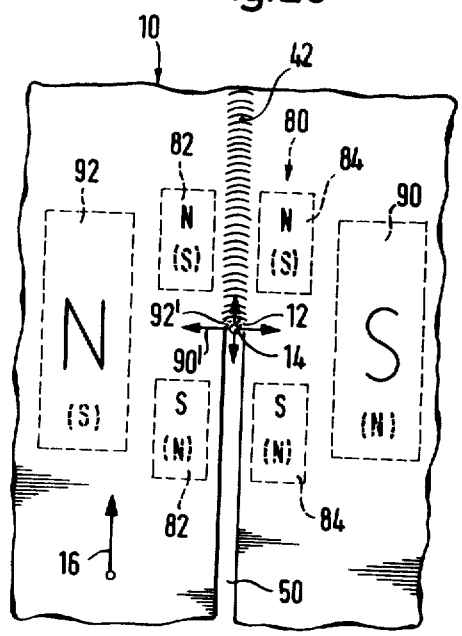
Figure 29:
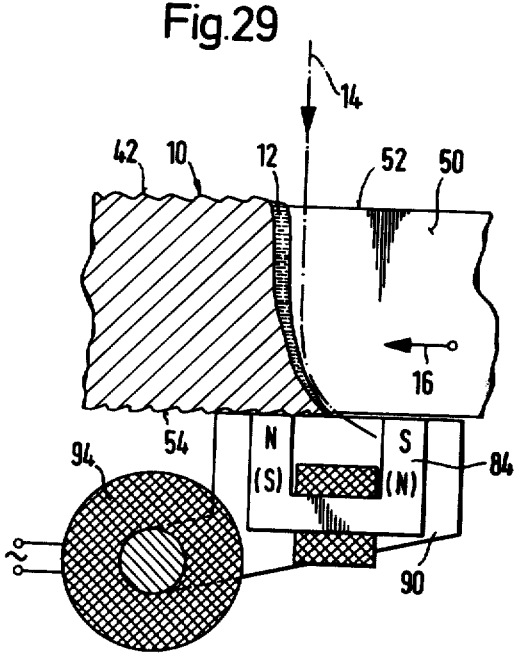

FIG. 13 is a view similar to FIG. 9 and shows the position of beam sensing electrodes used for regulating the position of the beam, and two different beam path which the beam may attain upon variation of a magnetic field deflecting the beam at the entrance and exit sides of the workpiece; the direction of welding may be horizontal;

FIG. 14A is a vertical section view of a workpiece and shows the path of an electron beam and pole pieces used for deflecting the beam; the welding direction is assumed to be vertical upwards;

FIG. 14B is a view similar to FIG. 14A and shows the distribution of the magnetic field in the general direction of propagation of the beam;

FIG. 15 is a view in a direction XV—XV of FIG. 14A;

FIG. 16 is a section view of the beam entrance side of a workpiece and shows a retaining shoe positioned on the beam entrance side of the workpiece and a deflection field used for deflecting the beam from a steeply sloping path into an essentially horizontal path;

FIG. 17 is a perspectivic view of the shoe and workpiece shown in FIG. 16, and of a magnetic deflection device for producing the deflection field;

FIG. 18 is a side elevation view of a magnetic deflection device and retaining means positioned at the beam entrance side of the workpiece;

FIG. 19 is a plan sectional view of a modification of the system shown in FIG. 18;

FIG. 20 is a plan view on a workpiece comprising a gap welded be means of an electron beam, and a magnetic deflection device;

FIG. 21 is a sectional view at section line XXI—XXI of FIG. 20;

FIG. 22 is a vertical sectional view at section line XXII—XXII of FIG. 20;

FIGS. 23 and 24 are views, corresponding to FIGS. 21 and 22, of a modification of the deflection device shown in FIGS. 20 to 22;

FIG. 25 is the plan view, seen in the direction of propagation of an electron beam, of a device for oscillating the beam in a direction normal to the weld seam;

FIG. 26 is a vertical sectional view at section line XXVI—XXVI of FIG. 25;

FIG. 27 is a sectional view at section line XXVII—XXVII of FIG. 25;

FIG. 28 and FIG. 29 are views similar to FIGS. 25 and 26 of a modification of the magnetic deflection system shown in FIGS. 25 to 27.

Since electron beam (E.B.) welding is the most common type of energy beam welding, as far as workpieces of essential thickness are concerned, the invention will be described in the following as applied to electron beam welding. The term "beam path" is intended to mean the center axis of the beam, if the beam is stationary, or the mean center axis, if the beam is periodically oscillated, e.g. in a direction normal to a gap to be welded. Such beam oscillation or "wagging" is generally used when welding workpieces of essential thickness with an electron beam.

FIG. 1 shows a known device for retaining, in a workpiece arrangement 10 (which may be consist of two metal plates to be joined by E.B. welding), a pool 12 of molten metal produced by an electron beam 14 during the welding operation. The workpiece arrangement 10 is moved in vertical direction (shown by arrow 16) with respect to the beam 14, which in turn is directed in horizontal direction onto the workpiece.

A first cooled retaining shoe 18 is positioned at a beam entrance side or surface 52, and a second melt retaining shoe 20 is positioned at a beam exit side or surface 54 of the workpiece. During welding the vertically extending weld seam, both shoes are moved synchroneously with the beam in upward direction.

The upper edge of the shoes 18,20 must obviously lie below the beam 14; thus the known device cannot be used for horizontal welding (with a horizontal beam) nor in case of a thick workpiece because the molten material will flow over the shoes.

According to the invention, this problem can be avoided, as shown in FIG. 2, by deflecting the beam 10 at or closely before the beam entrance surface 52 such that it slopes down into a trough-shaped pit or cavity formed by a melt retaining shoe 18 mounted movable with respect to the workpiece.

Within the workpiece, the beam path may be inclined down with respect to the horizontal, as shown, so that it lies in the plane of the joint or weld seam. The beam may be oszillated across the gap 50, as schematically shown by a double arrow 22. Since the beam now enters the shoe from above, the melt retaining shoe 12 at the beam entrance side can be positioned at a level high enough to prevent the melt from flowing out from the welding site, without taking the risk, that the shoe is hit and damagged by the beam. A backing device 24 is preferably placed at the beam exit point, if the beam penetrates the workpiece entirely. The backing device 24 may comprise a channel-shaped member 26 having a generally U-shaped cross section and filled with a particulate backing material, as coarse metal powder 28. The walls of the member may be foraminous to allow escaping gases and vapours from the melt. No such backing device is needed, if the beam energy is chosen such that the depth of penetration of the beam is less than the thickness of the workpiece, for example, penetration to point 23 shown in FIG. 2.

The inclination of the beam (in relation to the horizontal) and the spacing of the edge of the retaining shoe from the surface of the workpiece at the beam entry point are adapted to one another so that the beam is just no longer hampered by the edge of the retaining shoe (see FIG. 2).

The shaping of the retaining shoe is adapted, by forming a trough 38 to the main direction of the flow of the melt on emerging from the weld position such that the melt pushed out of the zone of impingement of the beam flows back to the workpiece in an arc remote from the beam (see FIG. 5), and so can again enrich the melt pool at the welding position in the interior of the workpiece in order to avoid cavities, this being reinforced by the force of gravity (see FIG. 2).

In order that the flowing back of the melt described above may not be hampered, the temperature of the melt should not drop substantially as a result of contact with the retaining shoe; this should therefore, for its part, not be adversely effected by the hot melt in a "retaining section A" (FIG. 6), and either should be able to be heated to an appropriate extent, for example by intermittently being acted upon the beam (or a portion of the cross-section of the beam) and/or be made from a special material with low heat conduction, e.g. by providing a ceramic insert 32 or lining. In a "cooling section B" of the retaining shoe, the upper bead of the weld seam should be formed to a desired predetermined geometry: Here the retaining shoe must be well cooled and have a satisfactory thermal conductivity in order that the melt may cool during the shaping and then solidify. Since the volume is reduced in the course of solidification, the further movement of the workpiece in relation to the mould shoe is not hampered.

The trough 38 is defined by side walls 44 and a front wall 46. These walls are higher than the level of the melt. The cooling section A forms a chamber connected by tubes into a system for circulating a coolant, as water. The side of the trough, which is adjacent the beam entrance surface of the workpiece is open and its edge may be provided with sealing means, as a groove comprising a packing or cord of asbestos fibers. Further, the cooling section B has in its surface, which is opposed to the beam entrance surface, a tapering slot 40, e.g. of generally semi-circular crosssection, which acts as a mould for forming the solidifying metal into a properly shaped upper weld bead 42.

The shoe is supported by a bar, which is fixed with respect to a beam gun 15 (FIG. 2). The trough-shaped configuration of the ceramic insert 32 is shown in FIG. 7. The wall of the trough opposed to the workpiece and remote therefrom may be curved to deflect the flow of the melt back to the workpiece, and the bottom of the trough preferably rises from the open side of the trough towards the front wall 46.

Generally speaking, the beam may be deflected in the vicinity of the beam entrance side 52 and/or in the vicinity of the beam exit side 54. Thus the beam 14 approaches the workpiece in a downwardly sloping portion 14a of the beam path, is deflected in the region of the beam entrance side 52 to a portion 14b within the workpiece, which portion may be horizontal or slightly sloping downwards (as in FIG. 2) or being curved throughtout its length. At the beam exit side 54 the beam is preferably deflected a second time into a rising portion 14c as shown in FIG. 9. Since the point or points, where the beam penetrates the surface of the workpiece is higher than the adjacent portion of the beam within the workpiece, no retaining device at all may be necessary at all, and if such a device is used, it operation is essentially improved and easier.

As schematically shown in FIG. 10, the tendency of the molten metal to flow out of the welding zone of the workpiece can be further reduced by supplying an additional filler material in the form of a wire or rod 56 of metal into the melt at the beam entrance side and/or beam exit side (FIG. 10). The metal rod 56 cools the melt and further has a physical retaining effect. The deflection of the beam can be effected by magnetic deflection devices 58 shown in FIGS. 11 and 12. Deflection device 58 comprises a yoke 59 of a magnetically soft material and a solenoid magnet coil 60 surrounding the yoke and creating, upon excitation by a direct current a magnetic flux. The yoke has pole pieces 62 positioned on or closely to the respective surface of the workpiece on opposite sides of the welding zone or gap 50 to be welded so that a magnetic flux pattern 64 is provided which causes the desired deflection of the beam. The beam may enter the workpiece from above at an angle of e.g. 45 degree in relation to the vertical beam entrance surface of the workpiece. In the region of the beam entrance surface, preferably also somewhat within the workpiece, the beam is deflected e.g. into the horizontal by means of the magnetic field which penetrates (non-magnetic workpiece material) or is conducted (feromagnetic workpiece material) into the interior of the workpiece. Before emerging from the workpiece, the beam is then deflected again upwards, so that it emerges inclined at an angle, for example 45° to the beam exit surface.

The position of the beam path within the workpiece can be controlled by means of probe electrodes as shown in FIGS. 13 and 14. Two pairs of probe electrodes s1, s2 and S1 and S2 are provided; the electrodes of each pair being spaced in a direction transversely to the beam path while the pairs are spaced in a direction along the beam path. The probe electrodes may be tungsten wires or rods extending in horizontal direction. The deflection of the beam at the entrance and exit sides is effected by magnetic fields 66 and 68, respectively, produced by deflection devices 58a and 58b, respectively.

When the deflection field 66 becomes weaker, the beam path shifts from position 14' to position 14", thus, the beam current intercepted by electrode s1 will increase, while the current intercepted by electrode s2 decreases. The signals developed by the electrodes s1 and s2 are applied to input terminals of a differential amplifier 59a, which produces a first error signal for regulation of the deflection current in the deflection device 58a. This is preferably effected with a short time constant.

When the deflection field 68b becomes weaker, the beam path shifts from position 14''' to position 14''''. The short time constant regulation will keep the beam essentially centered with respect to electrodes S1 and S2, and the beam current intercepted by electrode S1 will become larger than that intercepted by electrode S2. The signals developed by S1 and S2 are applied to a further differential amplifier 59b, which developes a second error signal for regulating the deflection device 58b in a sense to minimize the difference of the intercepted beam currents. The time constant of the regulating circuit comprising the differential amplifier 59b is much larger, say by at least one order of magnitude, than that of the regulating circuit of amplifier 58a, so that no interference (hunting) can occur.

FIG. 14A is a vertical cross section through a gap 50 between two workpiece parts, and shows the path of an electron beam 14 which is deflected upwards by an angle of, say 20° by a magnetic field shown in FIG. 14B as having a peak value of about 200 Gauss which can be produced by an electromagnet of 4000 ampere turns. A deflection device as shown in FIG. 11 can be used, the pole pieces of which being applied to the beam entrance surface on opposite sides of a gap 50 between two workpiece parts to be joined by EB welding. The gap may have a width of 3 mm, and the portions of the workpiece which define the gap, cat as extensions of the pole pieces, as shown in FIG. 15. The pool of molten metal produced by the deflected beam may then lie about 5 to 10 mm below the beam entrance point.

FIGS. 16 and 17 show the use of a magnetic deflection device 58 of the type disclosed with reference to FIGS. 11 and 12 in combination with a retaining shoe 18' which may generally be constructed as explained with reference to FIGS. 2 to 5. However, the width W of the shoe 18' should be kept small so that the separation between the pole pieces 62 does not become excessive, which would make it difficult to produce a magnetic deflection field of an appropriate strength. In the case of the deflected beam, as shown in FIGS. 16 and 17, it is easy to devise the shape of the shoe 18' so that the melt is properly retained without running into the difficulty to obstruct the beam path as shown in FIG. 17, one of the pole pieces 62 may be shaped to accomodate the weld bead 42 shaped by the shoe as explained with reference to FIGS. 2 to 5.

FIG. 18 is an end elevation view showing a workpiece having a vertical gap 50 welded by an electron beam 14 deflected by a deflection device 58' of the same general type as discussed with reference to FIGS. 11 and 12. The pole pieces 62' are cut out at their front end to enable reception of a bundle of metal wires 74 which assist retaining the melt within the workpiece. Alternatively, as shown in dashed lines in FIG. 18 and in FIG. 19, a particulate backing material 72 may be used which is supplied to the welding site by a duct 70 which has an open top at least at the end adjacent to the workpiece so that the beam path is not obstructed.

The embodiments disclosed with reference to FIGS. 16 to 19 are particularly suited for welding workpieces of a magnetic material as steel, since the beam is deflected shortly before entering the workpiece, and thus, no penetration of the magnetic field into the workpiece is necessary. If desired, the beam can be deflected also at the beam exit side in a similar manner.

The backing material 72 and the material of the wires 74 are preferably non-magnetic, e.g. a non-magnetic stainless steel may be used for this purpose.

The beam deflection according to the invention can also be used with advantage in the case of welding with a generally vertical beam as shown in FIGS. 20 to 22. It is known that about 20% of the beam current must emerge from the beam exit side of the workpiece if a proper rear side welding bead is to be produced. This makes the use of an effective conventional weld pool supporting device very difficult since any solid backing material, as a backing plate, becomes fused to the workpiece.

According to a further embodiment of the invention, the problem of retaining the melt in the workpiece when welding with a generally vertical electron beam, the beam is deflected in the plane of the weld seam shortly before leaving the workpiece at the beam exit side 54 such that it emerges almost tangentially from the beam exit side as shown in FIG. 22. FIG. 20 is a plane view onto the top side of the workpiece, and FIG. 21 shows the gap 50 between the workpiece parts to be welded by the beam, deflection device 58" positioned at the beam exit side 54 of the workpiece and producing a magnetic deflection field 68' which deflects the beam as desired. It is assumed in this case, that the workpiece consists of a non-magnetic material.

FIG. 21 shows that the magnetic deflection field may extend a considerable distance into the workpiece, which may cause an undesired deflection of the beam already in a middle portion of the workpiece. This can be avoided, as shown in FIGS. 23 and 24, by an additional magnetic field 68" poled in a direction opposite to that of the deflection field 68' proper. This compensating field is produced by an additional electromagnetic device 58a also positioned at the beam exit side but having a yoke straddling the deflection device 58". Thus, the magnetic field of the compensating device 58a is mainly effective farther away from the beam exit side and can, thus, properly compensate the far extending portions of the deflection field. Thus, the path of the beam is generally vertical, as shown in FIG. 24 until it enters the deflection 68' field which becomes active immediately adjacent to the beam exit surface 54. The deflection field 68' is poled so that the beam 14' is deflected in the direction of the gap 50.

The welding operation described with reference to FIGS. 20 to 24 can be further improved by individually or additionally oscillating the portion of the beam in the region of the beam exit surface 54. The direction of this oscillation may be across or lengthwise the weld seam or gap 50 and may be synchronized with a conventional oscillation of the beam to increase the amplitude of the conventional oscillation in the region of the beam exit side or the oscillation of the beam path at the beam exit side may be the sole oscillation of the beam or in addition and independent of the conventional oscillation.

The oscillation of the beam at the beam exit side 54 of the workpiece can be effected by a deflection device of the type schematically shown in FIGS. 25, 26, and 27 which show views corresponding to FIGS. 20, 21 and 22, respectively. Thus, for oscillating the beam 14 in a direction across the gap 50, a magnetic device 80 is used which has two pairs of pole pieces 82 and 84 which cooperate with a magnetic yoke 86 excited by a coil 88 supplied with an alternating current of a frequency of say between 25 and 1000 Hertz. The excitation is such that the pole pieces of each pair 82 or 84 have opposite polarities at a given moment while the pole pieces of the two pairs, which are adjacent to each other on opposite sides of the gap 50 or weld seam, have the same polarity at a given moment, as shown by the symbols N and S for a first given moment and (S) and (N) for a second given moment at which the polarity of the exciting current has changed.

FIGS. 28 and 29 show a system for oscillating the beam both in a direction 90 across the gap 50 and in a direction 92 in the lengthwise direction of the gap 50 and weld seam 42. This system comprises the deflection device explained with reference to FIGS. 25 to 27 and an additional electromagnetic device having a magnetic yoke 90 with pole pieces 92 excited by a coil 94 supplied with an alternating current of an appropriate frequency and phase relationship with respect to the current energizing the coil 88.

The magnetic devices described with reference to FIGS. 25 to 29 provide for oscillating the beam only and are used in combination with the deflection device 58" or deflection devices 58", 58a described with reference to FIGS. 20 to 24.

We claim:

1. Apparatus for welding a workpiece with a charged particle beam comprising means for directing a charged particle beam along a beam path onto a workpiece, means for moving said workpiece with respect to said beam path, means for retaining a pool of molten material in said workpiece adjacent said beam path, and beam deflection means operative to provide a curved beam path in the vicinity of at least one surface of said workpiece, said beam path being curved to avoid impingement on said retaining means.

2. Apparatus as specified in claim 1 wherein there is further provided means for adding material to said molten pool, said means being arranged to aid in retaining said pool in said workpiece.

3. Apparatus as specified in claim 1 wherein said retaining means comprises solidified workpiece material formed by said particle beams following said curved beam path and forming a cavity in said workpiece for retaining said pool of molten material.

4. Apparatus as specified in claim 3 wherein there is provided means at the beam exit surface of said workpiece for oscillating said beam path in a direction perpendicular to the relative movement of said workpiece with respect to said beam path.

5. Apparatus as specified in claim 3 wherein said workpiece comprises non-magnetic material and wherein said beam deflection means comprises means for generating a magnetic field, said magnetic field extending into said workpiece material.

6. Apparatus as specified in claim 5 wherein there are provided means for sensing the location of said beam path adjacent a beam exit surface, and means responsive to said sensing means for adjusting the magnitude of said magnetic field of said beam deflection means.

7. Apparatus as specified in claim 3 wherein there is provided first and second beam deflecting means, one for deflecting said beam into said curved beam path in the vicinity of a beam entrance surface of said workpiece, and the other to deflect said beam into said curve beam path in the vicinity of the beam exit surface of said workpiece, the curved beam path at the beam entrance and exit surfaces causing the formation of solidified weld material in a shape which retains said pool of molten material.

8. Apparatus as specified in claim 7 wherein said beam path has a downward direction adjacent said beam entrance surface and said path has a upward direction adjacent said beam exit surface.

9. Apparatus as specified in claim 1 wherein said retaining means comprises a melt retaining shoe positioned adjacent said workpiece in the vicinity of said beam path, said shoe including a trough for retaining said pool and wherein said beam deflecting means deflects said beam into said trough in said curved beam path.

10. Apparatus as specified in claim 9 wherein said trough is formed of material having a relatively low thermal conductivity thereby to retain heat in said pool.

11. Apparatus as specified in claim 10 wherein said shoe further includes a portion formed of material having a relatively high thermal conductivity, said further portion for cooling and solidifying said molten material.

12. Apparatus as specified in claim 11 wherein said further portion forms a tapered channel for shaping a weld bead.

13. Apparatus as specified in claim 10, 11 or 12 wherein said trough is formed as an insert, and wherein said material having a relatively low thermal conductivity comprises refractory material.

14. In a method for welding a workpiece with a beam of charged particles moving along a beam path onto said workpiece, wherein said workpiece is moved with respect to said beam path, and wherein a pool of molten material is maintained in the workpiece adjacent said beam path by a retaining means, the improvement wherein said charged particle beam path is deflected into a curved beam path in the vicinity of at least one surface of said workpiece to avoid beam impingement on the retaining means.

15. The method as specified in claim 14 wherein said workpiece comprises non-magnetic material and wherein said charged particle beam is deflected in a beam path which forms a pool retaining cavity in said workpiece.

16. The method as specified in claim 15 wherein said charged particle beam is deflected in the vicinity of both the beam entrance and exit surfaces in said workpiece.

17. The method as specified in claim 16 wherein said charged particle beam has a downward direction at said beam entrance surface and is deflected to have an upward direction at said beam exit surface, thereby to form a downwardly curved beam path in said workpiece for retaining said pool of molten material.

* * * * *